United States Patent

[11] 3,621,140

[72] Inventor John Michael Griffiths
Hillingdon, England
[21] Appl. No. 867,770
[22] Filed Oct. 20, 1969
[45] Patented Nov. 16, 1971
[73] Assignee The Post Office
London, England
[32] Priority Oct. 28, 1968
[33] Great Britain
[31] 51072/68

[54] APPARATUS FOR ALIGNING WORD INTERVAL SIGNALS WITH THE WORD FRAME OF RECEIVED DIGITAL DATA
6 Claims, 2 Drawing Figs.

[52] U.S. Cl. .................................................... 178/69.5 R, 179/15 BS, 328/155
[51] Int. Cl. .................................................... H04l 7/06
[50] Field of Search .......................................... 328/155; 179/15 BS; 178/69.5 R; 325/38 A

[56] References Cited

UNITED STATES PATENTS

| | | | |
|---|---|---|---|
| 3,241,067 | 3/1966 | James et al. .................. | 178/69.5 |
| 3,317,669 | 5/1967 | Ohnsorge ..................... | 178/69.5 |
| 3,403,377 | 9/1968 | Connolly et al. ............... | 179/15 BS |

FOREIGN PATENTS

| | | | |
|---|---|---|---|
| 1,069,650 | 5/1967 | Great Britain ................ | 179/15 BS |

*Primary Examiner*—Robert L. Richardson
*Assistant Examiner*—Donald E. Stout
*Attorney*—Hall & Houghton

ABSTRACT: The invention relates to a PCM synchronization system. The receiver generates a frame interval signal which identifies the length of frame within the transmitted serial digital data. Synchronization is produced by aligning the frame interval signals with a word framework of the received serial digital data. The detection of a forbidden data format within a frame indicates loss of synchronization between the transmitter and receiver. A cumulative store activates a phase correction mechanism for shifting the phase of a clock located at the receiver when the cumulative store reaches a numerical state which indicates the detection of the loss of synchronization above a threshold rate.

Figure 1:
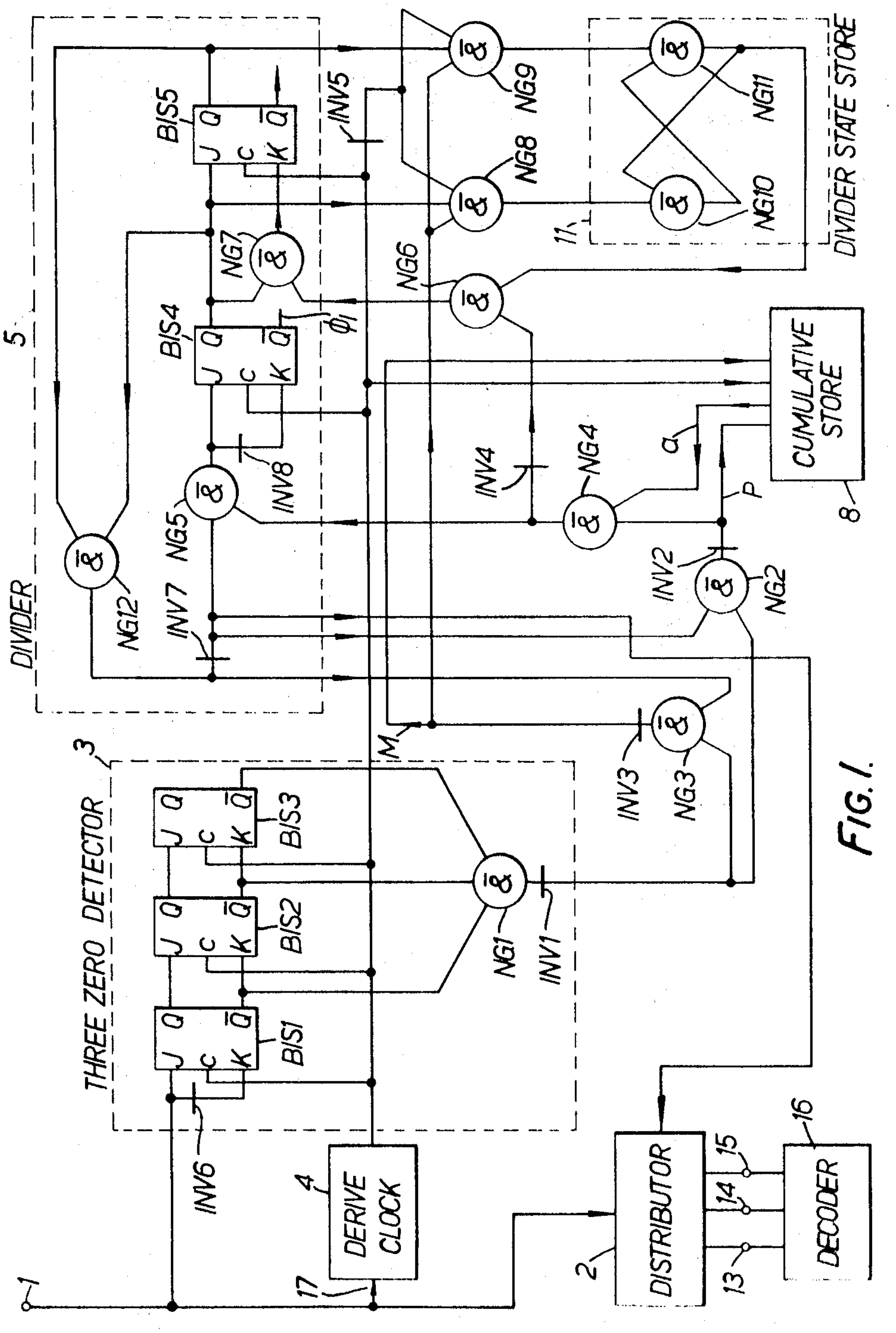

JOHN M GRIFFITHS
INVENTOR

BY Hall & Houghton
ATTORNEY

JOHN M GRIFFITHS

INVENTOR

BY [signature]

ATTORNEY

APPARATUS FOR ALIGNING WORD INTERVAL SIGNALS WITH THE WORD FRAME OF RECEIVED DIGITAL DATA

The present invention relates to synchronizing or aligning frame signals with the word framework of received digital data so that the data can be correctly decoded.

One method of transmitting information is to convert the information, which may be in the form of characters or the sampled amplitudes of a speech waveform for example, into groups of digits, the groups being transmitted to a remote point and there decoded to recover the information. These groups of digits are usually all of the same length and are referred to as "words", and in order to achieve the correct decoding of the transmitted data it is necessary for the receiving station to be able to separate the words one from the other for decoding. Various proposals have been made for synchronizing or aligning an incoming digital signal with a local clock oscillator at the receiving station, among which are methods which rely on a frame structure embedded in the original digital signal.

For example, in a known 30/32 channel pulse code modulation (PCM) system a 256-bit multiplex frame is employed and a 7-bit alignment pattern is provided in alternate frames. A known method of keeping alignment is to regard three successive "faulty" patterns as indicating loss of alignment. A single correct alignment pattern resets the count of faulty patterns to zero. While such systems generally provide an acceptable performance they nevertheless suffer from the disadvantage of tending to be slow in reestablishing alignment.

It is an object of the invention to provide an improved apparatus for aligning a locally generated frame signal with the word framework of received digital data. According to the present invention there is provided apparatus for aligning frame interval signals with the word framework of a received serial digital data consisting of words each having the same number, at least three, of digits, the coding of the words being such that at least one possible word length group of digits is not permitted in a word of the received data, the apparatus including:

- means for producing a clock signal from the received data
- interval-defining means producing signals defining frame intervals in response to the clock signal
- alignment-indication means responsive to the detection of a not-permitted group of digits in the received data overlapping parts of consecutive frames as defined by the frame interval signals to produce an indication of alignment,
- nonalignment-indication means responsive to the detection of a not-permitted group of digits in the received data within a frame interval as defined by the frame interval signals to produce an indication of nonalignment,
- storage means storing a total and responsive to the indication of alignment to modify the stored total by a first weight and responsive to the indication of nonalignment to modify the stored total by a second weight having an opposite effect to the first weight, the weights being such that a single indication of alignment does not always cancel the effect of previous occurrences of the indication of nonalignment, and
- phase-shifting means responsive to the total in the storage means to shift the phase of the frame interval signals relative to the received data when the total attains a threshold value.

Figure 2:
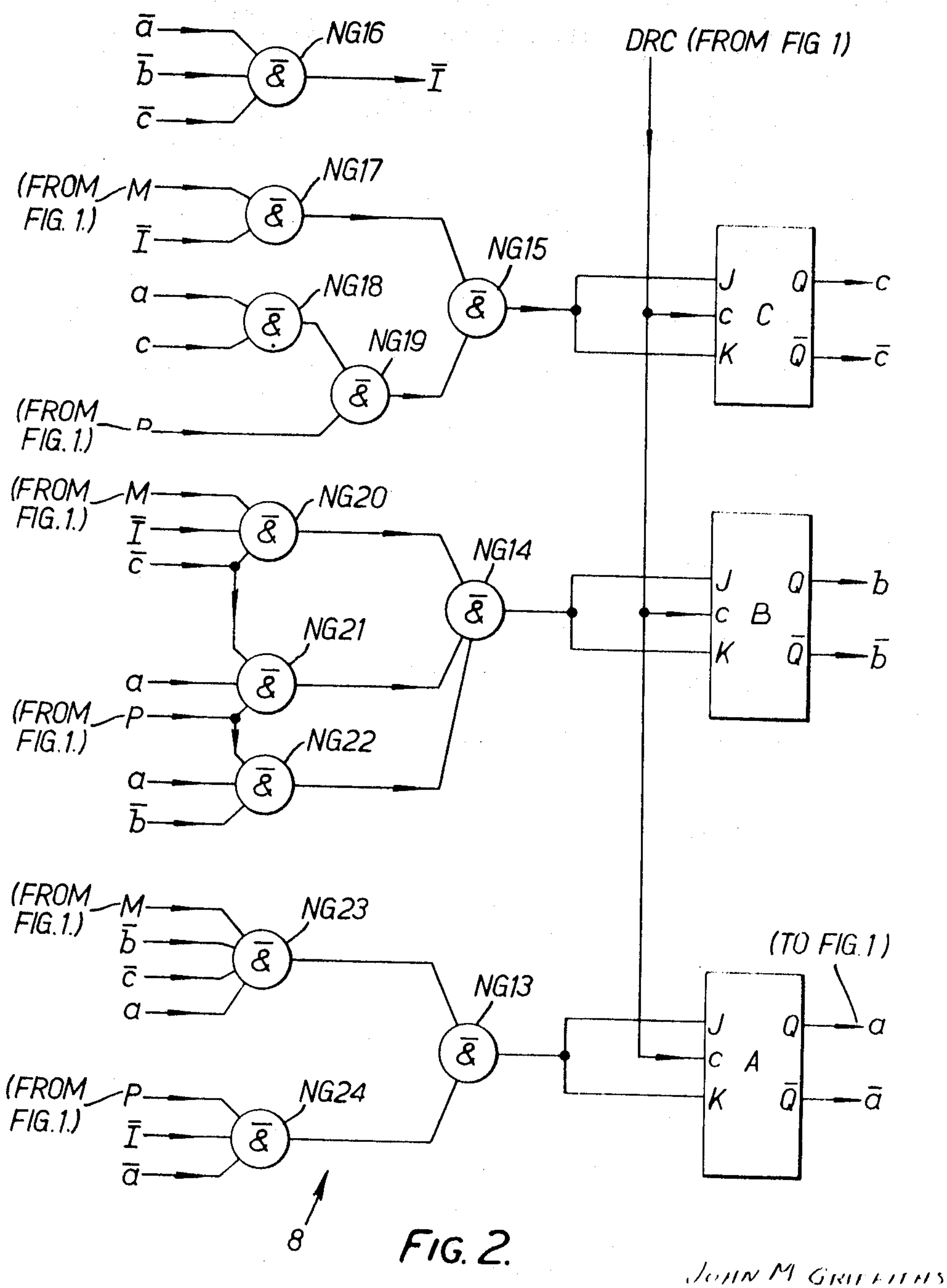

By way of example only, an embodiment of the invention will be described with reference to the drawings of which:

FIGS. 1 and 2 show receiving equipment of a digital data transmission system embodying the invention.

The embodiment of the invention comprises a digital data transmission system, using the triple ternary or 4B3T code. In this code the three ternary digits are 0, +1, −1 and as it is a three-digit code there are 27 possible combinations of these digits. The code, however, uses only 26 of these combinations, the word "000" being excluded. The example of the invention to be described uses the occurrence of the word "000" together with occurrences of this group not as a word to indicate whether phasing error of the local clock exists and, if so, causes the local clock to change its phase so as to tend to bring the clock into alignment with the received data. Under normal error-face operating conditions it is possible for three or four consecutive zeros to occur in the data as parts of two consecutive words, but unless loss of alignment has occurred no group of three consecutive zeros will be received as a word, in the absence of transmission errors. A group of three zeros forming a word is referred to as an "all zero word" and provides an indication of nonalignment, and a group of three zeros or more straddling the boundary between two consecutive words is referred to as an "out of word all zero group" and provides an indication of alignment.

In one example of the invention the all zero words and the *out of word all zero groups* are used to produce respective weights of +3 and −1 and the cumulative weight is stored so that under normal conditions the cumulative weight tends to be of decreasing positive value but is never allowed to become less than zero, whereas if alignment has been lost a positive weight is stored, a threshold value of +7, which is the maximum cumulative weight, being chosen so that if the cumulative weight reaches this value an indication is produced that word alignment has been lost. Having detected loss of alignment, the clock may be synchronized with the received digital data again, simply by shifting the phase of the clock by one digit of the incoming signal stream, either once or twice. After a phase shift of one digit has been effected alignment may or may not be reestablished, but if it is established the cumulative weight will rapidly return to 0 with the occurrence of out *of word all zero groups*, but on the other hand if alignment is not established the fact that the cumulative weight is already high will make the apparatus sensitive to *all zero words* and a second digit shift will soon occur to reestablish alignment. Immediate realignment can, however, be obtained by utilizing the fact that *out of word all zero groups* which occur after alignment has been lost will do so, in the absence of transmission error, in a position relative to the timing of the signals from the clock that indicates the change of phase of the clock necessary to restore alignment.

In FIG. 1 the input digital data is applied to the terminal 1 which is connected to a distributor 2 serving to convert the words of the received data from serial to parallel form on the three output terminals 13, 14, 15 for decoding in decoder 16. The data is also applied to a three-zero detector 3 which produces an output signal whenever three zero digits occur sequentially in the input data.

The ternary line signal is also applied via line 17 to the input of a clock signal deriving unit 4, consisting essentially of a rectifier followed by a narrow passband filter and a squaring stage, whose output is a square wave of 1:1 mark-space ratio and period equal to the digit period of the ternary signals.

The three-zero detector 3 comprises three JK bistables BIS1, BIS2, BIS3, two inverters INV1, INV6, and three-input NAND-gate NG1. The incoming ternary data is fed to the J input of BIS1 and via the inverter INV6 to the K input. The Q and $\overline{Q}$ outputs of BIS1 are connected respectively to the J and K inputs of BIS2 and the outputs of BIS2 are connected similarly to BIS3. The inputs of the NAND-gate NG1 are connected respectively to the Q outputs of BIS1, BIS2 and BIS3. The output of NAND-gate NG1 is connected to the input of inverter INV1. The JK bistables are clocked at the digit rate by a signal from the clock signal unit 4. A "1" appears at the output of INV1 when three consecutive zeros have been detected in the ternary input. The output of INV1 is connected to an input of each of two two-input NAND-gates NG2, NG3. The distributor 2 is driven by the output of the clock signal unit 4 and is regulated in phase by an output of a divide-by-three circuit 5, which consists of pulses which delineate word intervals.

The two-input NAND-gates NG2, NG3 are connected to respective outputs of the divide-by-three circuit 5 so that the outputs of the gates NG2 and NG3 respectively indicate the occurrence of an all zero word and an out of word all zero group.

The divider 5 comprises three two-input NAND-gates NG5, NG7, NG12; two inverters INV7, INV8; and two JK bistables BIS4, BIS5. The output of NAND-gate NG5 is fed as a J input to BIS4 and via inverter INV8 to the K input. The Q output of BIS4 forms the J input to BIS5 while the K input is the output of NAND-gate NG7. The inputs of NG7 are BIS4 Q output and the output of a further two-input NAND-gate NG6. NAND-gate NG12 has inputs connected to BIS4 and BIS5 Q outputs respectively. The output of NG12 forms the above-mentioned input connection to NG3 and is also connected to the input of inverter INV7. The output of INV7 provides the word interval pulses pulses which are applied to the distributor 2, and the above-mentioned input to NAND-gate NG2, and an input to NG5. For the different states of the divider 5 the bistables BIS4 and BIS5 have the following states:

| Divider State | BIS4 Q output | BIS5 Q output |
|---|---|---|
| 1 | 0 | 1 |
| 2 | 1 | 0 |
| 3 | 1 | 1 |

The outputs of NAND-gates NG2, NG3 are inverted respectively by inverters INV2, INV3 and applied to a cumulative weight store 8 (described in detail later with reference to FIG. 3), the signals being effective to amend the weight stored by +3 and −1 respectively within the limitations of the maximum and minimum store counts chosen to be +7 and 0. The output of INV2 designated P is a "1" when an all zero word has been detected and that of INV3 designated M a "1" when an out of word all zero group has been detected.

The output of INV2 is fed to a two-input NAND-gate NG4 whose other input is a signal "*a*" from the cumulative weight store 8. The significance of the signal "*a*" will be explained in detail later. The output of INV4 provides one input of the NAND-gate NG6 whose other input is a STATE STORED signal from a divider state store 11. The STATE STORED signal is a "1" for state 1 of the above table and a "0" for state 2 and state 3.

The operation of the divider state store 11 will now be described. The Q outputs of bistables BIS4 and BIS5 are fed as inputs to three-input NAND-gates NG8 and NG9 respectively. The output of INV3 (the STORE STATE signal) is fed to each of these gates as is also the clock signal after inversion by an inverter INV5. The output of NG8 is thus $\overline{\text{STORE STATE}\ .\ \text{CLOCK. Q BIS4}}$, and the output of NG9 is $\overline{\text{STORE STATE}\ .\ \text{CLOCK . Q BIS}}$. On termination of the clock pulse which produces the STORE STATE signal the output of NG8 is Q BIS4 and the output of NG9 is Q BIS5. In this condition (an out of word all zero group having been detected) the divider 5 is in either state 1 or state 2 of the table and thus the outputs of NG8 and NG9 are either 1 and 0 or 0 and 1 respectively. The divider state store 11 comprises two two-input NAND-gates NG10 and NG11. The output of NG10 is connected to an input of NG11 whose other input is connected to the output of NG9. The output of NG11 provides the above-mentioned STATE STORED signal and is also connected to an input of NG10 whose other input is connected to the output of $NG_8$. Thus in state 1 NG10 and NG11 have outputs 0 and 1 respectively, and 1 and 0 in state 2. When the next clock pulse occurs and the outputs of NG8 and NG9 both become "1" the 1 and 0 detected the output of states of NG10 and NG11 persist. When an all zero word is detected the output of NG4 is "0" and the divider 5 is in state 3. The output of NG5 becomes "1" so that on the next clock pulse Q BIS4 is set to "-". NG6 inverts the input of NG11, and NG7 in turn inverts the output of NG6 (since Q BIS4 is "1") and hence Q BIS5 will either be set to 1 by the next clock pulse or change to "0" depending on whether store 11 is storing state 2 or state 1. The divider thus steps from state 3 either to state 3 again (retarding) or on to state 2 (advancing) on the next clock pulse which is equivalent to being instantaneously set to the state stored in the store 11. The weight accumulated in the store S remains 0 during normal error-free operating conditions. Isolated digital errors which cause the occasional occurrence of an all zero word do not cause the cumulative weight to reach +7. It may be shown that if the probability of a digital error is $10+^{7}$ then the probability of a cumulative weight of +7 is about 1 in $10^{20}$ digits, and if the digital error probability is $10^{14}$ than the probability of a weight of +7 is about 1 in 10 digits. On the other hand if the clock is in fact out of alignment then the mean time for the cumulative weight to reach +7 during the receipt of encoded random information is about 530 ternary digits. Other weights for the occurrence of all zero words and out of word all zero groups and limiting cumulative weights may be used, although the values given above provide good performance and simplicity of hardware.

The cumulative weight store 8 will now be described in more detail with reference to FIG. 2. The store 8 comprises five two-input NAND-gates NG13, NG15, NG17, NG18, NG19; six three-input NAND-gates NG14, NG16, NG20, NG21, NG22, NG24; one four-input NAND-gate NG23, and three clocked JK bistables A, B, C. The bistables A, B, C are clocked at the digit rate by the output of the clock unit 4. The JK inputs of bistables A, B, C are connected to the outputs of NG13, NG14, NG15 respectively. The Q and $\overline{Q}$ outputs of the bistables A, B, C are designated $a$, $\bar{a}$; $b$, $\bar{b}$; $c$, $\bar{c}$ respectively. Signals $\bar{a}$, $\bar{b}$, $\bar{c}$ form the inputs to NG16 the output of which is designated I. The outputs of NG17 and NG19 form the inputs to NG15, similarly NG20, NG21 and NG22 supply inputs to NG14 and NG23 and NG24 to NG13.

The output of INV3 (FIG. 1) is connected as one input to NG17 whose other input is the signal $\bar{I}$. The inputs of NG18 are the signals $a$, $c$ and its output forms one input of NG19 whose other input is the output of INV2 (FIG. 1).

The remaining NAND gates have inputs as follows:

NG20 : output INV3, $\bar{I}$, $\bar{c}$; NG21 : $\bar{c}$, a output INV2;
NG22 : output INV2, $a$, $\bar{b}$; NG23 : output INV3, $\bar{b}$, $\bar{c}$, $a$;
NG24 : output INV2, $\bar{I}$, $\bar{a}$.

The bistables A, B, C have associated weights 4, 2, 1 respectively. Bistable A changes state if the output of NG13 is a "1" when the clock pulse occurs and bistables B and C operate in a similar manner. The signal I is a "1" when one or more of the bistables A, B, C is in the "1" state, i.e. when the cumulative weight is not zero.

The store obeys the following logical equations output NG13$=(M\cdot a\cdot\bar{b}\cdot\bar{c})+(P\cdot\bar{a}\cdot\bar{I})$ output NG14$=(M\cdot\bar{I}\cdot\bar{c})+(\bar{c}\cdot\bar{a}\cdot P)+(P\cdot a\cdot\bar{b})$ output NG15$=M\cdot\bar{I}+P\cdot(\bar{a}+\bar{c})$ Bistable A changes state in response to a P signal of "1" if the cumulative weight is greater than 1 and less than 4, and in response to an M signal of "1" if the cumulative weight is 4. Bistable B changes state due to a P signal of "1" if the cumulative weight is 0, 2, 4 or 5, and due to an M signal of "1" if the cumulative weight is 2, 4 or 6. Bistable C changes state due to a P signal of "1" if the cumulative weight is other than 5 or 7, or due to an M signal of "1" if the cumulative weight is not 0. Thus the cumulative weight is increased by 3 for a P signal of "1," decreased by 1 for an M signal of "1" and limited above and below at 7 and 0 respectively. The feature of the total weight being limited above and below avoids the cumulative buildup of a large weight of either kind which might take a long time to overcome and thereby slow down the indication of loss of alignment and also the restoration of alignment.

It will be appreciated that the condition of signal P being "1" is an indication of loss of alignment and increases the total weight stored by 3 (always provided that the store limit of 7 is not exceeded). Similarly the condition of signal M being "1" is an indication of alignment and decreases the total weight stored by 1 (the minimum total weight being 0). Signal "*a*" is "1" when the total count is greater or equal to 4 and is applied with signal "P" to NAND-gate NG4. The output of NG4 provides a DO NOT RESET DIVIDER signal. Thus when "*a*" is "1" and "P" is also "1" the word rate clock (divider 5) is shifted by one digit. If the system is still out of alignment this process is repeated until signal "M" is a "1" when the count is reduced by one. Further, M=1 signals will reduce the total weight to 0, although the occurrence of a single P signal of "1" when the total weight is greater than or equal to 4 will cause a further phase shift of the divider.

When a cumulative weight of +7 is about to be accumulated in the store 8 the divider 5 is reset to the state it had at the last occurrence of an out of word all zero group. It may be shown that this change in the state of divider 5, assuming that the last out of word all zero group occurred after the loss of alignment, will restore the alignment of the apparatus with the received digital data.

Failure to restore alignment may occur in the unlikely events that either the last out of word all zero group included a digital error or no out of word all zero group occurred between the time the apparatus lost alignment and the detection of the loss of alignment. In these cases the state of the divider 5 will be changed and again loss of alignment will be detected and at the second change the alignment will be restored. While the system is aligned the state of the divider 5 will be stored in the store 11 on the occurrence of the out of word all zero group which normally occur, but this state is not used and may be disregarded.

The store 11 is such that it stores only the last state entered into it via the gates NG8, NG9.

Although the invention has been described with reference to a specific example, it will be appreciated that it is not limited to this example and that the invention when practiced as illustrated in the embodiment may be applied to other not permitted groups of digits or several such groups or to other forms of coding having not permitted groups of digits. Other modifications are possible within the scope of the invention. For example the weights may be arranged to multiply or divide the total in the cumulative store instead of adding to and subtracting from it; the weight store may be of an analogue type such as a capacitor store instead of a digital store. Other values of weight may be used besides those stated in the examples.

I claim:

1. Apparatus for aligning frame interval signals with the word framework of received serial digital date consisting of words each having same number, at least three, of digits, the coding of the words being such that at least one possible word length group of digits is not permitted in a word of the received data, the apparatus including;

means for producing a clock signal from the received data;

interval-defining means producing signals defining frame intervals in response to the clock signal;

alignment-indication means responsive to the detection of a not-permitted group of digits in the received data overlapping parts of consecutive frames as defined by the frame interval signals to produce an indication of alignment;

nonalignment-indication means responsive to the detection of a not-permitted group of digits in the received data within a frame interval as defined by the frame interval signals to produce an indication of nonalignment;

storage means storing a total and responsive to the indication of alignment to modify the stored total by a first weight and responsive to the indication of nonalignment to modify the stored total by a second weight having an opposite effect to the first weight; the weights being such that a single indication of alignment does not always cancel the effect of previous occurrences of the indication of nonalignment; and phase-shifting means responsive to the total in the storage means to shift the phase of the frame interval signals relative to the received data when the total attains a threshold value.

2. Apparatus according to claim 1, in which the storage means responds to the indications of alignment and nonalignment by adding the first and second weights respectively to the total in the storage means.

3. Apparatus according to claim 2, in which the weights are constant, the second weight is three times the first weight, and the storage means is such that the stored total is bounded at the threshold value and at a value spaced from the threshold value by seven times the first weight.

4. Apparatus according to claim 1 in which the storage means responds to the indications of alignment and nonalignment by multiplying the stored total by the first and second weights respectively.

5. Apparatus according to claim 1 in which the storage means is such that when the stored total reaches predetermined limiting valves its response is inhibited to that one of the indications of alignment and nonalignment which otherwise would cause the stored total to move outside the threshold values.

6. Apparatus according to claim 1 wherein the phase-shifting means is responsive to the last indication of alignment preceding an indication of nonalignment causing the total in the storage means to attain the threshold value to produce after the occurrence of the indication of nonalignment a shift in the phase of the frame interval signals relative to the clock oscillator tending to restore alignment.

* * * * *